United States Patent
Beatty et al.

(10) Patent No.: US 11,699,200 B2
(45) Date of Patent: Jul. 11, 2023

(54) REAL ESTATE SHOWING COMPARISON APPLICATION

(71) Applicant: CARRIER CORPORATION, Palm Beach Gardens, FL (US)

(72) Inventors: Jackson Beatty, Molalla, OR (US); Debbie Bell, Monmouth, OR (US); Jeff Antrican, Salem, OR (US); Adam Kuenzi, Silverton, OR (US)

(73) Assignee: Carrier Corporation, Palm Beach Gardens, FL (US)

( * ) Notice: Subject to any disclaimer, the term of this patent is extended or adjusted under 35 U.S.C. 154(b) by 588 days.

(21) Appl. No.: 16/626,959

(22) PCT Filed: Jun. 19, 2018

(86) PCT No.: PCT/US2018/038150
§ 371 (c)(1),
(2) Date: Dec. 27, 2019

(87) PCT Pub. No.: WO2019/005524
PCT Pub. Date: Jan. 3, 2019

(65) Prior Publication Data
US 2020/0134749 A1    Apr. 30, 2020

Related U.S. Application Data

(60) Provisional application No. 62/527,591, filed on Jun. 30, 2017.

(51) Int. Cl.
*G06Q 50/16* (2012.01)
*G06F 16/9537* (2019.01)
(Continued)

(52) U.S. Cl.
CPC .......... *G06Q 50/16* (2013.01); *G06F 16/9537* (2019.01); *G07C 9/00309* (2013.01); *G07C 9/28* (2020.01)

(58) Field of Classification Search
CPC ................. G06F 16/9537; G06F 16/23; G06F 16/24575; G06F 16/24578; G06F 16/248;
(Continued)

(56) References Cited

U.S. PATENT DOCUMENTS 7,177,819 B2   2/2007   Muncaster et al.
8,593,252 B2   11/2013  Fisher
(Continued)

OTHER PUBLICATIONS

International Search Report and Written Opinion dated Sep. 3, 2018 issued for PCT/US2018/038150.

*Primary Examiner* — Dionne Pendleton
(74) *Attorney, Agent, or Firm* — Bachman & LaPointe, P.C.

(57) ABSTRACT

A system and method for determining real estate showing data includes electronically receiving subject property; determining a set of comparable properties based on the subject property; determining showing data for the subject property; determining showing data for at least one of the set of comparable properties; and electronically communicating the showing data for the subject property and the showing data for at least one of the set of comparable properties.

19 Claims, 6 Drawing Sheets

(51) Int. Cl.
*G07C 9/28* (2020.01)
*G07C 9/00* (2020.01)

(58) Field of Classification Search
CPC .............. G06F 16/9535; G06F 16/487; G07C 9/00309; G07C 9/28; G07C 2209/08; G07C 9/00174; G07C 9/00571; G07C 9/0069; G06Q 50/16; G06Q 10/067; G06Q 10/06; G06Q 10/1095; G06Q 10/1097; G06Q 10/20; G06Q 30/00; G06Q 30/012; G06Q 30/02; G06Q 30/0202; G06Q 30/0623; G06Q 40/08; G06Q 50/163; G06Q 30/0201; G06Q 30/0282; G06Q 10/02; G06Q 10/06393; G06Q 10/10; G06Q 20/10; G06Q 30/0205; G06Q 30/0206; G06Q 30/06; G06Q 30/0613; G06Q 30/0627; G06Q 30/0629; G06Q 30/0631; G06Q 30/0645; G06Q 40/03; G06Q 50/01; G06Q 50/06; G06Q 50/184; Y02P 90/80; G09F 9/00; G06T 19/006; G06T 2219/004; H04M 11/025; H04M 1/0291; H04M 1/72412; H04M 1/72418; H04M 2250/12; H04N 7/186; H04N 5/33; H04N 7/185; H04N 7/188; G05D 23/1917; G05F 1/66; G06N 20/00; G08B 13/19684; G08B 15/00; G08B 19/00; G08B 25/009; G08B 3/10; G08B 7/06; G08B 7/064; G10L 15/26; H04L 12/2803; H04L 12/2818; H04L 12/2823; H04L 12/2825; H04L 2012/2841; H04L 2012/2849; H04L 51/222; H04W 4/021; H04W 4/029; H04W 4/12

See application file for complete search history.

(56) References Cited

U.S. PATENT DOCUMENTS

| | | | |
|---|---|---|---|
| 9,053,629 | B2 | 6/2015 | Fisher et al. |
| 9,426,623 | B2 | 8/2016 | Eaton et al. |
| 10,346,924 | B1* | 7/2019 | Engelhorn ............. G06Q 40/08 |
| 2006/0106628 | A1 | 5/2006 | Faherty et al. |
| 2007/0067180 | A1 | 3/2007 | James et al. |
| 2007/0226046 | A1 | 9/2007 | Share |
| 2007/0260465 | A1 | 11/2007 | Cook |
| 2009/0030718 | A1 | 1/2009 | Bengson |
| 2009/0153291 | A1 | 6/2009 | Larson et al. |
| 2011/0066561 | A1* | 3/2011 | Lazarre ............. G06Q 30/0202 705/313 |
| 2011/0251974 | A1* | 10/2011 | Woodard ............... G06Q 50/16 705/348 |
| 2011/0276499 | A1 | 11/2011 | Walsh et al. |
| 2011/0301987 | A1 | 12/2011 | Wiese |
| 2014/0114845 | A1* | 4/2014 | Rogers ................. G06T 19/006 345/419 |
| 2014/0375422 | A1* | 12/2014 | Huber ................ G07C 9/00571 340/5.61 |
| 2015/0126219 | A1 | 5/2015 | Eaton et al. |
| 2015/0221054 | A1* | 8/2015 | Colangelo ............. G06Q 20/10 705/39 |
| 2015/0326576 | A1 | 11/2015 | Eckerdt et al. |
| 2015/0341603 | A1* | 11/2015 | Kasmir .................... H04N 5/33 340/584 |
| 2016/0042479 | A1 | 2/2016 | Oertli et al. |
| 2016/0292740 | A1 | 10/2016 | Akhavan-Saraf et al. |
| 2016/0364929 | A1 | 12/2016 | Fisher et al. |
| 2020/0034861 | A1* | 1/2020 | Lundgren ............. G06N 20/00 |

* cited by examiner

REAL ESTATE SHOWING COMPARISON APPLICATION

BACKGROUND

The present disclosure relates generally to a real estate buyer feedback system, and more particularly, to a system and method to compare showing duration of comparable properties based on buyer feedback.

In the real estate industry, the listing agent must often, at the seller's behest, contact the showing agent to receive feedback as to the buyer's perspective on the subject property. This can be a time-consuming practice and can lead to seller frustration in understanding what actions may facilitate sale from the perspective of the buyer who views their home. One indicator of the buyer's perspective on the home is the duration the buyer spends at the showing and if they visit on multiple occasions. Typically, home sellers do not have access to such information other than from the showing agent.

SUMMARY

A method for evaluating real estate showing data for a subject property, according to one disclosed non-limiting embodiment of the present disclosure can include electronically receiving a subject property; determining a set of comparable properties based on the subject property; determining showing data for the subject property; determining showing data for at least one of the set of comparable properties; and electronically communicating the showing data for the subject property and the showing data for the at least one of the set of comparable properties.

A further embodiment of the present disclosure may include that the determining showing data for the subject property includes determining an average showing duration for the subject property.

A further embodiment of the present disclosure may include that the determining the average showing duration for the subject property is performed over a time period.

A further embodiment of the present disclosure may include that the determining showing data for the subject property includes determining a number of showings for the subject property.

A further embodiment of the present disclosure may include that the determining the number of showings is performed over a time period.

A further embodiment of the present disclosure may include that the determining showing data for the for the at least one of the set of comparable properties includes determining an average showing duration for the at least one of the set of comparable properties.

A further embodiment of the present disclosure may include that the determining the average showing duration for the at least one of the set of comparable properties is performed over a time period.

A further embodiment of the present disclosure may include that the determining showing data for the at least one of the set of comparable properties includes determining a number of showings for the at least one of the set of comparable properties.

A further embodiment of the present disclosure may include that the determining the number of showings is performed over a time period.

A further embodiment of the present disclosure may include comparing the showing data for the subject property and the showing data for at least one of the set of comparable properties.

A further embodiment of the present disclosure may include that the comparing is performed by a showing application on a handheld device.

A further embodiment of the present disclosure may include that the comparing is performed by a subsystem that electronically receives the subject property.

A further embodiment of the present disclosure may include that the at least one comparable property relates to at least one of comparable geographical area, comparable price, comparable number of bedrooms, and comparable number of bathrooms.

A system for evaluating real estate showing data for a subject property, according to one disclosed non-limiting embodiment of the present disclosure can include an electronic key box; an electronic key server in communication with the electronic key box, the electronic key server including a database that stores showing data associated with the electronic key box; a buyer server in communication with the electronic key server; a buyer storage system in communication with the buyer server and the electronic key server, the buyer storage system including a database that stores property data; and a listing recommendation server hosting an analytics software application configured to determine a set of comparable properties from the property data stored in the buyer storage system based on a subject property stored in the buyer storage system, and configured to determine showing data for the subject property and at least one of the set of comparable properties.

A further embodiment of the present disclosure may include a handheld device running an agent application, the handheld device in electronic communication with the electronic key server and the electronic key box.

A further embodiment of the present disclosure may include a handheld device running an agent application, the electronic key box in communication with the electronic key server via the handheld device.

A further embodiment of the present disclosure may include a handheld device running an agent application, the handheld device operable to determine a proximity to the electronic key box to determine the showing data.

A further embodiment of the present disclosure may include that the showing data includes an entry time and an exit time associated with the subject property.

A further embodiment of the present disclosure may include that the analytics software application compares the showing data for the subject property and the showing data for at least one of the set of comparable properties.

A further embodiment of the present disclosure may include a handheld device running a showing application, the handheld device operable to compare the showing data for the subject property and the showing data for at least one of the set of comparable properties.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
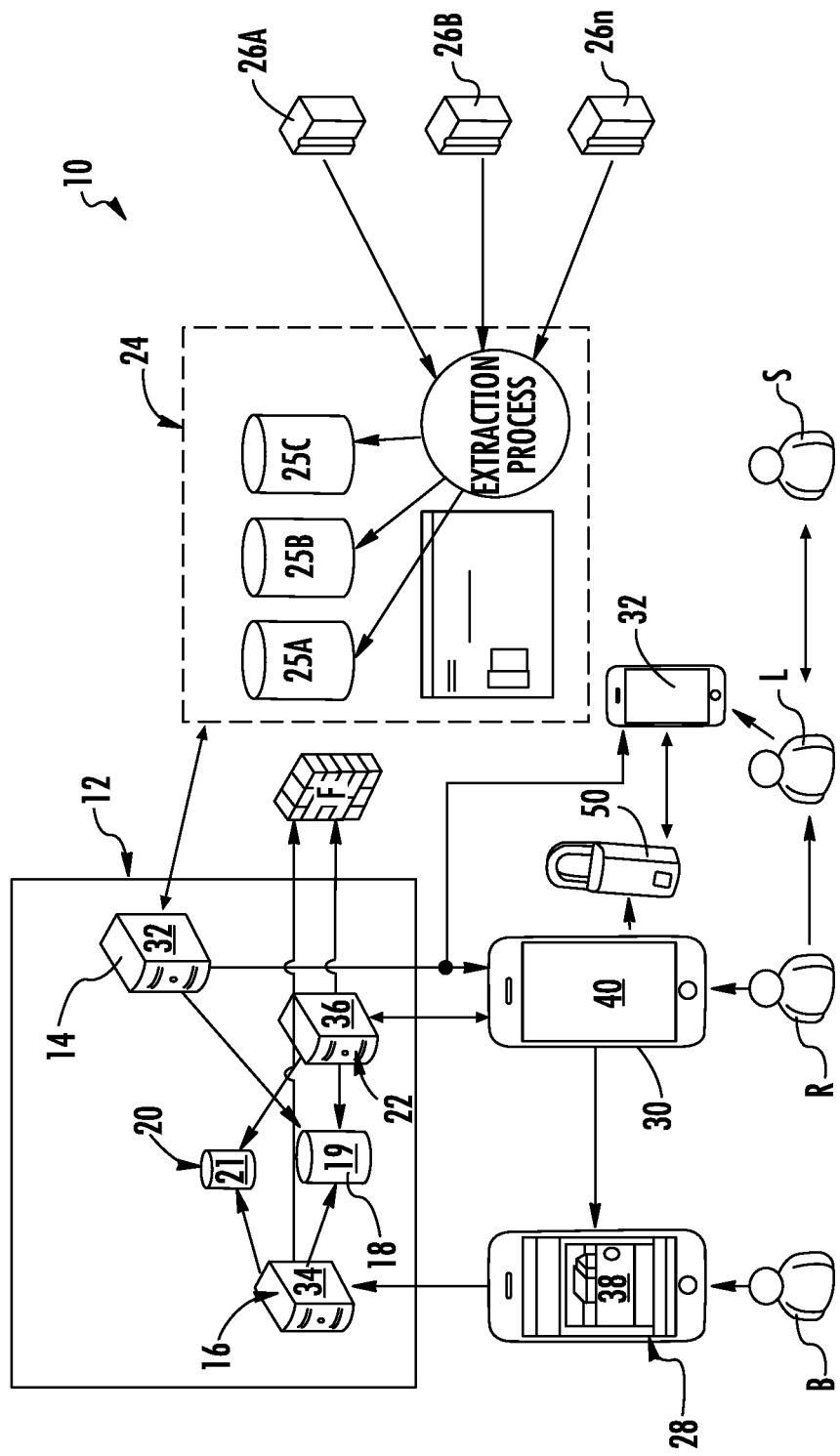
FIG. 1 is a general schematic system diagram of a real estate feedback application system.

FIG. 1 schematically illustrates a system 10 to facilitate communication for real estate transactions. A property buyer "B" is typically represented by a showing agent "R" while a property seller "S" is typically represented by a listing agent "L." The listing agent "L" communicates with the buyer "B" only indirectly, such as by communication with the showing agent "R" who then communicates information with the buyer "B." Although only particular agents are referred to in the illustrated embodiments, the functions of such personnel may be otherwise assigned or rearranged. For example, the listing agent "L" may be a senior person in an agency who utilizes a seller's assistant. The showing agent "R" may similarly utilize a showing assistant. As is discussed below, the prospective buyer "B" may wish to obtain input from third parties such as family, friends, and/or others.

The system 10 generally includes a subsystem 12 that may be controlled by a single owner. The subsystem 12 generally includes a listing recommendation server 14, a buyer server 16, a buyer storage system 18, a log storage system 20, and an electronic key server 22. The listing recommendation server 14 communicates with the buyer storage system 18, the log storage system 20, and a storage system 24. The buyer storage system 18 includes a database 19 that stores, for example, feedback created by the buyer "B" (e.g., buyer feedback, third party feedback, etc.). The log storage system 20 includes a database 21 that collects activity data associated with the property showings.

The storage system 24 may include, but not be limited to, a database for managing key holders 25A, a security database 25B that hosts security protocols, and a listing database 25C that stores extracted property data from external databases 26A, 26B, 26N. The storage system 24 communicates with the external databases 26A-26N such as the Real Estate Transaction Standard (RETS) framework that stores Multiple Listing Service (MLS) data. Communication between the various servers may include internet protocols or the like. The MLS data may include information such as number of bedrooms, number of bathrooms, price of listing, etc. RETS is a framework that can be adopted by computer systems to receive data from the MLS servers, as well as those of other real estate systems provided they also have software installed designed to communicate using the RETS framework. The national association of realtors refers to RETS as a "common language."

A multiple of handheld devices 28, 30, 32, may electronically communicate with the subsystem 12. For example, the handheld devices 28, 30, 32, may be a smartphone, tablet, or other mobile device of the respective individual. Handheld device 28 is used by the potential buyer "B," handheld device 30 is used by the showing agent "R," and handheld device 32 is used by the listing agent "L. Various other handheld devices such as those used by the third parties may also be in electronic communication with the subsystem 12 either directly or through communication with the handheld devices 28, 30, 32, as an intermediary.

Information is accessible by the listing agent "L" through the subsystem 12 so that the listing agent "L" can, for example, generate reports for their seller "S," send updates about a particular listing to showing agents "R", or provide feedback from a buyer "B" to their seller "S." The subsystem 12 may also obtain information from a Real Estate Transaction Standard (RETS) framework that stores MLS data. The subsystem 12 may also obtain information generated through the Agent Application 40 that resides on handheld device 30 interacting with an electronic key box 50 that occurs as a consequence of the showing, such as number of times shown, time spent at the subject property for each showing, return showings, etc. The subsystem 12 may also be used by the listing agents "L" to receive automatic notification (e.g., email notices) when a showing occurs at their listings. The subsystem 12 may also be used by the buyer "B" as a repository for information (e.g., details of each property the buyer has viewed, feedback on the properties, etc.). The seller "S" can also receive feedback from the buyer "B" either directly from the subsystem 12, or through electronic communications with the listing agent "L" who communicates with the subsystem 12.

The listing recommendation server 14 hosts, for example, at least an analytics software application 32 that compiles and runs analytics against buyer ratings from the buyer data storage 18 and MLS listing data from the storage system 24. The buyer server 16 hosts a buyer application program interface (API) 34, and the electronic key server 22 hosts an electronic key API 36. An application program interface (API) may include a set of routines, protocols, and/or tools for building software applications. The API specifies how software components should interact. APIs are used when programming graphical user interface (GUI) components. A server-side web API is a programmatic interface with one or more publicly exposed endpoints to a defined request-response message system.

The listing recommendation server 14 may electronically communicate with a real estate application 38 on the handheld device 28 through the buyer API 34. An agent application 40 on the handheld device 30 may communicate with the listing recommendation server 14 and the electronic key server 22. The buyer API 34 and the electronic key API 36 may also communicate with other external systems through a firewall "F."

The real estate application 38 may be a mobile application on the handheld device 28 that may be used by the buyer "B" to rate the properties they have seen and, as will be further described below, receive third party feedback from third parties based on the buyer "B" feedback. The real estate application 38 communicates with the buyer storage system 18 through the buyer API 34 which then stores the feedback, ratings, and notes taken by the property buyer in the database 19 of the buyer storage system 18.

The agent application 40 may be a mobile application on the handheld device 30 that may be used by the showing agent "R" to access the electronic key boxes 50 via a short distance communication standard (e.g., Bluetooth). Alternatively, or in addition, the electronic key boxes 50 may be connected (e.g., cellular) directly to the listing recommendation server 14. The electronic key API 36 of the electronic key server 22 communicates with the agent application 40 to sync activity information from the electronic key boxes 50 to the electronic key API 36 (e.g., accessed key boxes, update the count of proprietary keys generated for that particular property, create a timestamp indicating that lockbox is opened), and showing notifications (e.g., to an associated showing agent "R").

Figure 2:
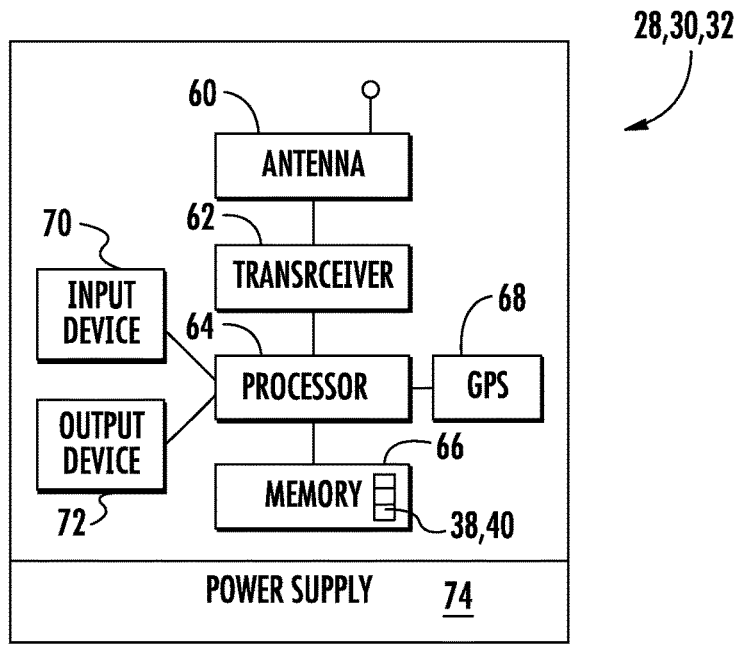
FIG. 2 is a schematic diagram of a handheld device.

With reference to FIG. 2, each handheld device 28, 30, 32, generally includes a handheld device antenna 60, a handheld device transceiver 62, a handheld device processor 64, a handheld device memory 66, a GPS module 68, an input device 70, a display 72, and a handheld device power supply 74. The handheld device processor 64 may be any type of microprocessor having desired performance characteristics. The handheld device memory 66 may include any type of computer readable medium that stores the data and executable instructions described herein below. The executable instructions may be stored or organized in any manner and at any level of abstraction, such as in connection with one or more applications, processes, routines, procedures, methods, etc.

Figure 3:
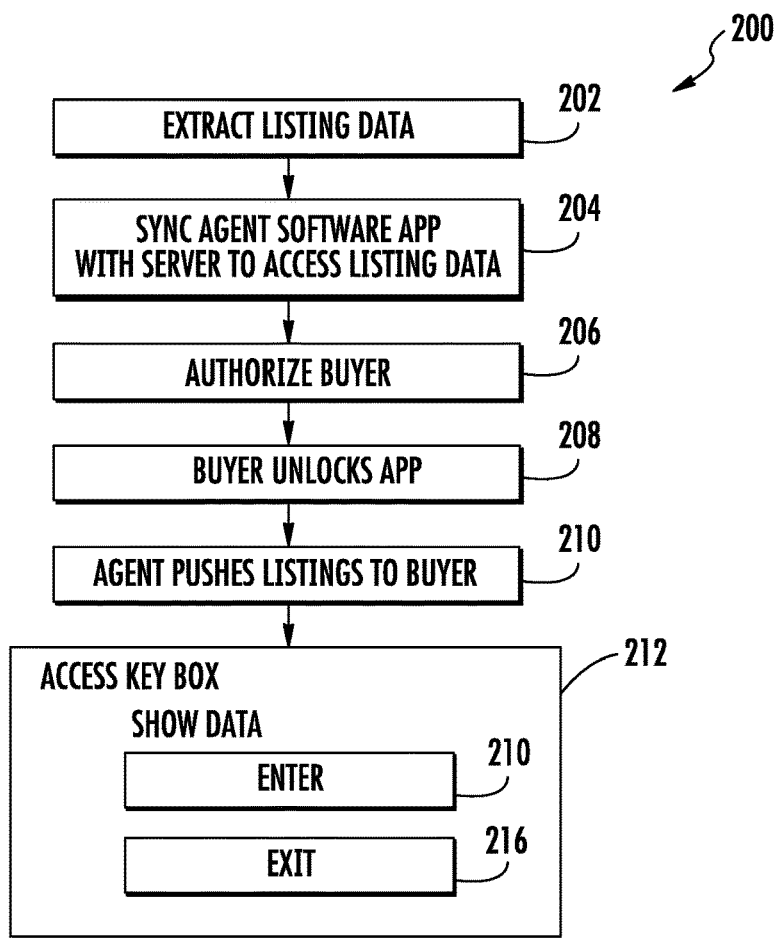
FIG. 3 is a flowchart of a method to provide feedback for real estate, with the system of FIG. 1.

With reference to FIG. 3, a method 200 for operation of the system 10 is disclosed in terms of functional block diagrams. The functions are programmed software routines capable of execution in various microprocessor based electronics control embodiments and represented herein as block diagrams.

Initially, the owner of the subsystem 12 may have agreements with MLS to selectively extract (202) data such as MLS data from the external data servers 26A-26N (FIG. 1) through the listing recommendation server 14. Next, the agent application 40 syncs (204) with the listing recommendation server 14 and pulls MLS data for desired property listings of interest to the buyer "B" as, for example, selected by the showing agent "R." This may be performed through an automated sync through the agent application 40. The showing agent "R" may also perform a manual sync to obtain the MLS data.

Through the agent application 40, the showing agent "R" can then authorize (206) the property buyer "B" to access the desired property listings of interest to the buyer "B." Through the agent application 40, the showing agent "R" may, for example, authorizes the buyer "B" through input of buyer identification information (e.g., buyer name and email address.) The buyer identification information is then electronically communicated to the listing recommendation server 14 so that the listing recommendation server 14 communicates the buyer "B" (e.g., via email, text, or other electronic communication to provide a link to an app store) with a code to unlock (208) the real estate application 38. The buyer "B" is then authorized to download the real estate application 38 and the desired property listings of interest to the buyer "B," to maintain the value of the showing agent "R" in the real estate transaction. Alterntively, the buyer "B" already has the real estate application 38 and the desired property listings of interest to the buyer "B" are received.

Figure 4:
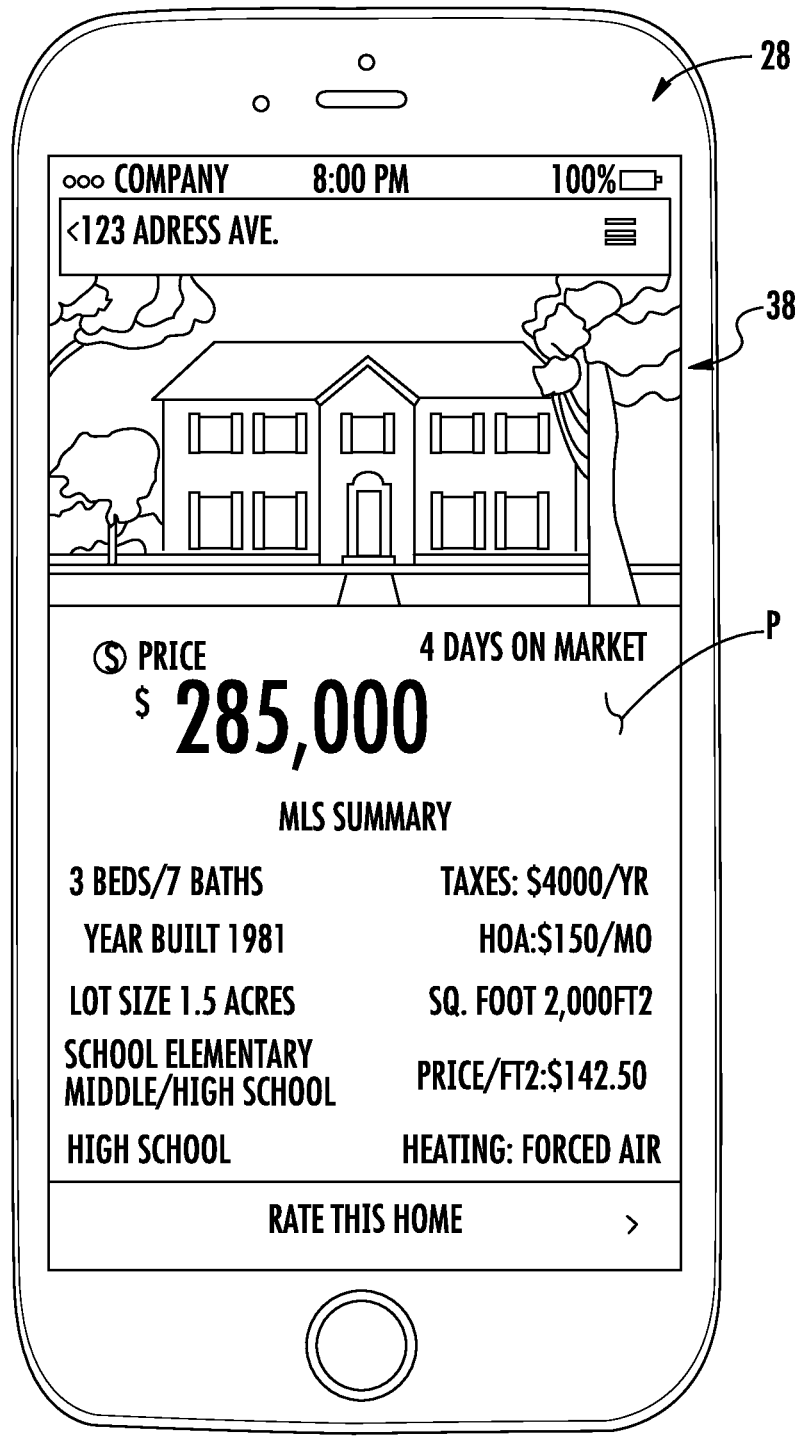
FIG. 4 is a screenshot of the real estate feedback application property listing view.

Through the agent application 40, the showing agent "R" can continue to push (210) property listings to the real estate application 38. Access may be provided for one or more properties by a showing code, or other information that unlocks one or more modules in the real estate application 38. The modules may include features or other aspects such as the showing application 500 (FIG. 5) that are particular tailored to certain parties in the real estate transaction. The showing agent "R" is able to selectively push the desired property listings of interest to the buyer "B" (one example property listing illustrated by screenshot "P"; FIG. 4) through the subsystem 12 to be viewable within the real estate application 38.

Figure 5:
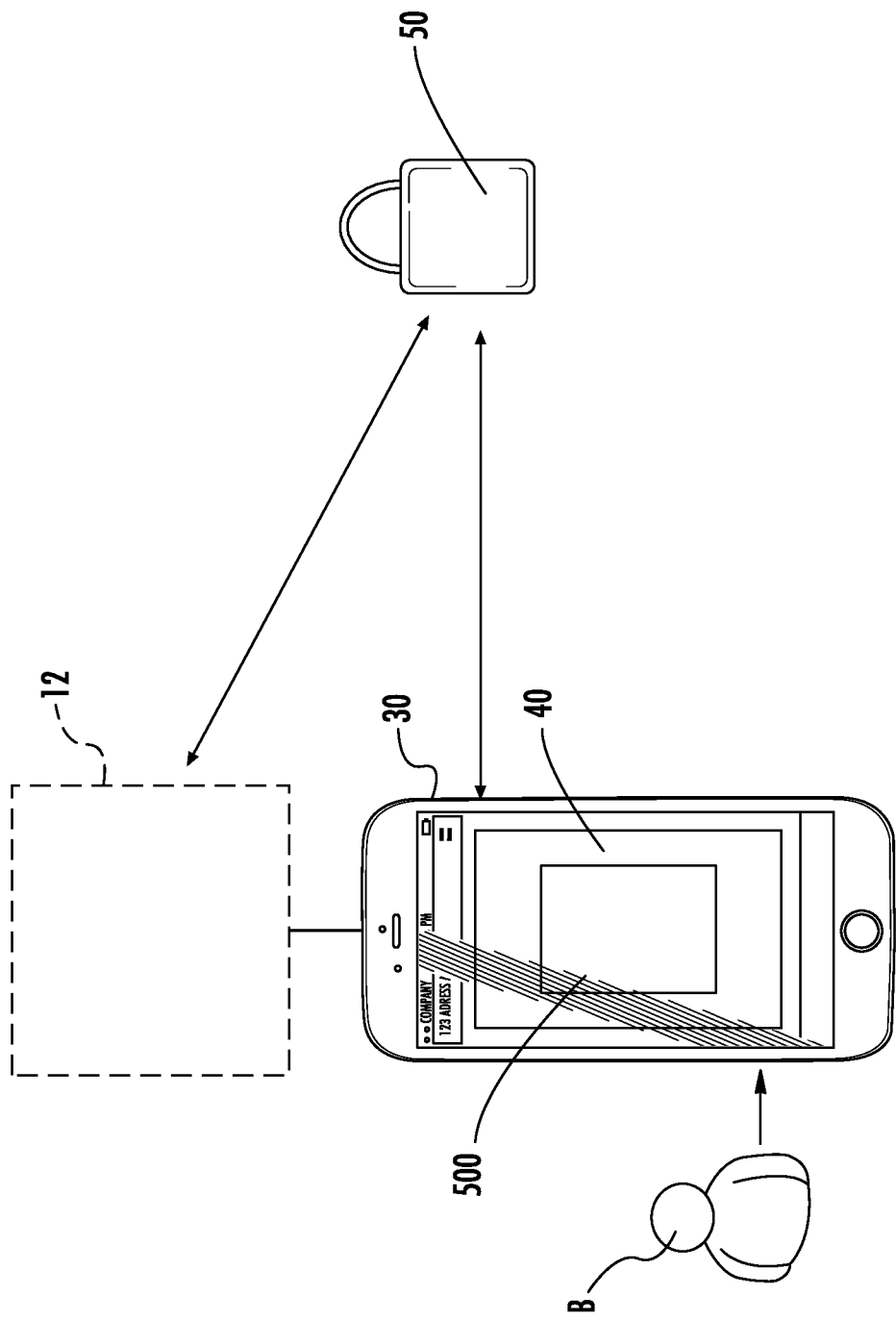
FIG. 5 is a schematic system diagram of a portion of the real estate application system.

The showing agent "R" also uses the agent application 40 to operate the electronic key box 50 to access (212) the property for showing to the buyer "B." The electronic key box 50 may communicate with the subsystem 12 either directly such as via a cellular communication or indirectly by short range communication through the agent application 40 (FIG. 5).

Access to the electronic key box 50 results in an entry time stamp recordation (214) being communicated by the electronic key box 50 to the electronic key server 22. When the showing is completed, the electronic key box 50 results in an exit time stamp recordation (216) being communicated by the electronic key box 50 to the electronic key server 22. Alternatively, the time stamp recordation (214, 216) may be based on a proximity to the electronic key box 50 determined by, for example, the GPS module 68 in the handheld device being proximate to the electronic key box 50.

With reference to FIG. 5, in addition to the features discussed above, the seller "S" can utilize a showing application 500 to determine showing duration for comparison of their subject property to comparable properties. The showing application 500 may be a separate application and/or a module of the real estate application 38, the agent application 40, or a separate Internet based interface.

Figure 6:
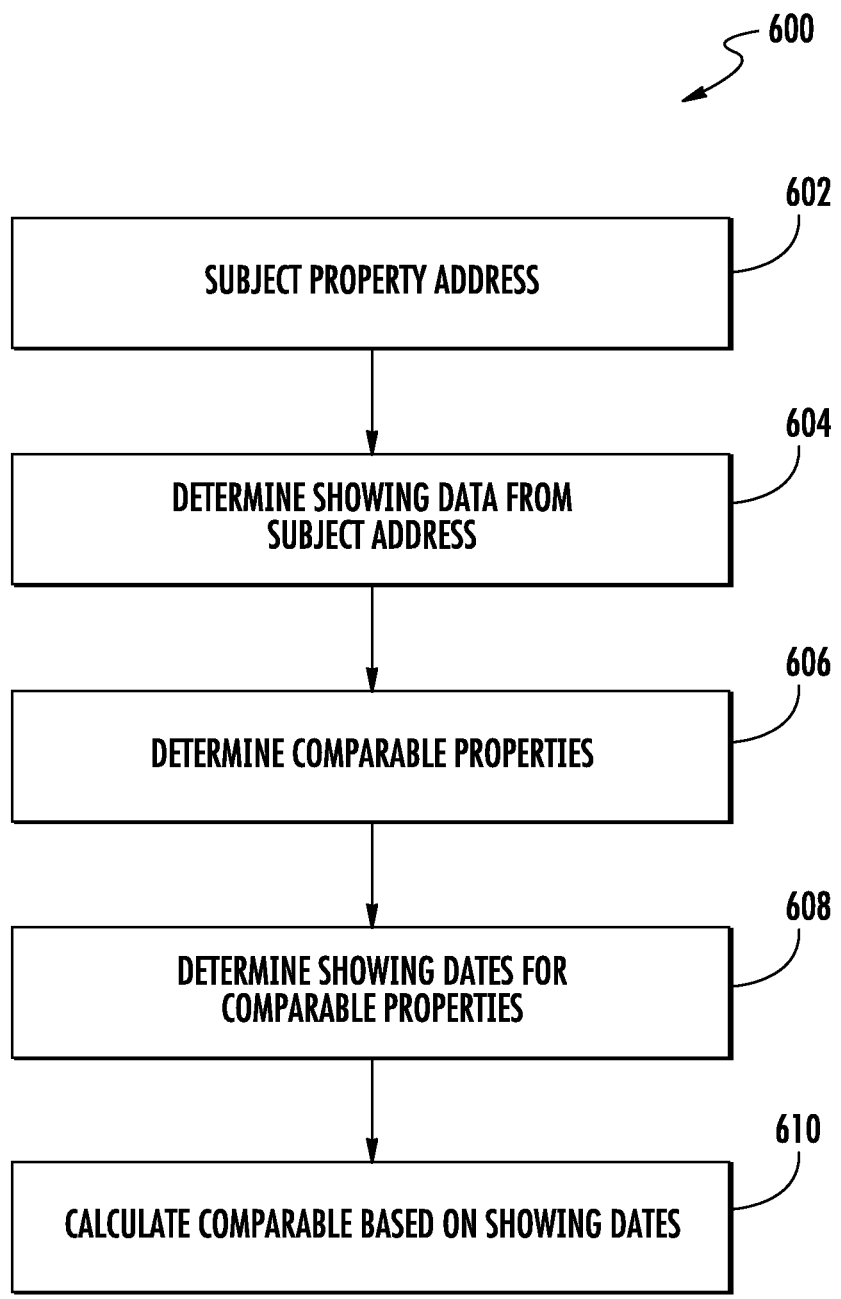
FIG. 6 is a flowchart of a method to determine an agent using a showing application.

With reference to FIG. 6, a method 600 for determining a showing duration is illustrated in terms of functional block diagrams. Initially, a user such as the seller "S" accesses the showing application 500 to input (602) an address (FIG. 7; 502) of the subject property. The subject property address is then communicated by the showing application 500 to be received by the subsystem 12 and access the electronic key server 22 to identify buyers who have visited the subject property. The electronic key server 22 contains showing data for the subject property (604) from the electronic key box 50 to determine the showing data. The showing data may include, for example, duration of the visit in minutes, the number of visits, repeat visits, etc.

Next, the showing application 500 may utilize MLS information from the subject property to determine comparable properties (606). The comparable properties may be based on, for example, other properties in the buyer database that have comparable square footage, comparable price, comparable status, comparable bedrooms, comparable bathrooms, comparable garage, comparable fireplaces, comparable basement, etc. to the subject property. Alternatively, or in addition, the showing application 500 may utilize MLS information from the subject property to determine the comparable properties based on a geographic area or other relationship with the subject property (e.g., such school district, demographics, etc.). The showing application 500 then accesses the electronic key server 22 to determine (608) the buyers who have visited the comparable properties and the duration of each visit.

Figure 7:
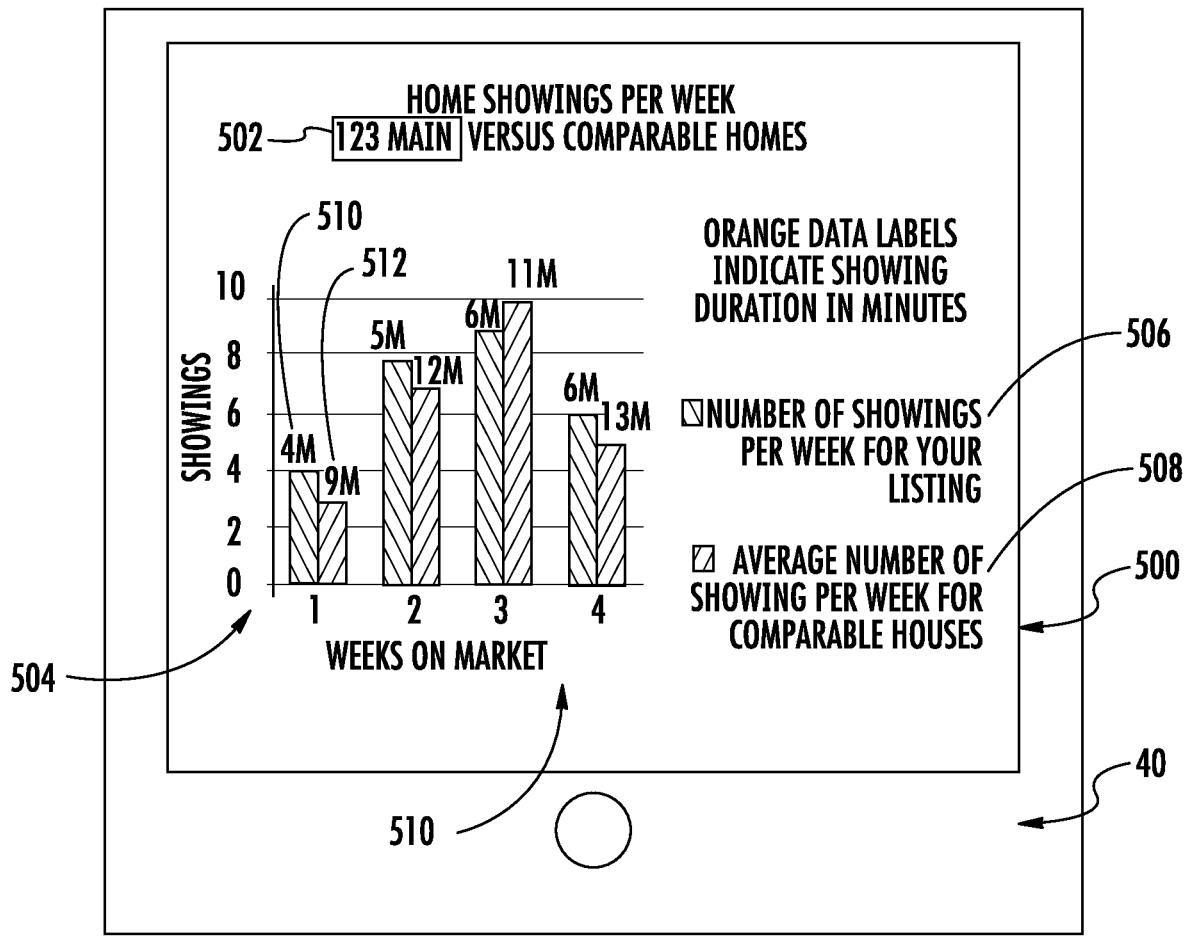
FIG. 7 is a screenshot of example filters for the showing application.

Next, the showing application 500 and/or the listing recommendation server 14 calculates a showing comparison (610) for display on the showing application 500 (FIG. 7). That is, the showing comparison may include duration calculations from the showing data. The showing comparison, duration, and other data may be calculated on the handheld device or the subsystem 12.

With Reference to FIG. 7, in at least one embodiment, the showing comparison may be displayed as a bar graph 504. The showing duration comparison may include, for example, display of a showing duration of the subject property for a specific buyer compared to the average time spent at other properties for that specific buyer; a showing duration for a specific buyer at the subject property compared to the average time spent at the subject property by other buyers; and/or a showing duration of repeated showings of the subject property for a specific buyer. A comparison may be provided on the bar graph between the number of showings per week for the subject property 506 as compared to an average number of showings per week for the comparable properties 508. The bar graph may be further defined over a number of weeks 510 on the market. An average time spent at the subject property in minutes 510 may be compared to an average time spent at the comparable properties 512 for each week.

The showing application 500 provides feedback to the seller if buyers are spending less time touring their home compared to comparable homes, which may indicate less interest in their home. The showing application 500 also provides feedback to a seller on potential seriousness of a specific buyer based on time spent in touring the subject property compared to other properties.

The term "server" conveys its customary meaning that provides service and/or data connection, e.g., to the handheld device and/or an electronic locking device. The term "handheld device" refers to a portable electronic device that is at least configured to send messages to, and/or receive messages from the listing recommendation server 14 over a long-range wireless communication network, such as a SMS, wireless, or cellular network. Examples of handheld devices include, but are not limited to: a cell phone; a personal digital assistant ("PDA"); a portable computer configured to store and playback digital pictures, songs, and/or videos; and the like. In addition, the handheld device is typically also configured for short-range wireless communications.

The elements described and depicted herein, including in flow charts and block diagrams throughout the figures imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A method for evaluating real estate showing data for a subject property, comprising:
   electronically receiving a subject property;
   determining a set of comparable properties based on the subject property;
   determining showing data for the subject property, wherein the determining showing data for the subject property includes determining an average showing duration for the subject property;
   determining showing data for at least one of the set of comparable properties, wherein the determining showing data for the at least one of the set of comparable properties includes determining an average showing duration for the at least one of the set of comparable properties;
   electronically communicating the showing data for the subject property and the showing data for the at least one of the set of comparable properties, further comprising comparing the showing data for the subject property and the showing data for at least one of the set of comparable properties, and wherein the electronically communicating comprises presenting a graphical comparison of the showing data including showing duration for the subject property and the showing data including average showing duration for the at least one of the set of comparable properties.

2. The method as recited in claim 1, wherein the determining the average showing duration for the subject property is performed over a time period.

3. The method as recited in claim 1, wherein the determining showing data for the subject property includes determining a number of showings for the subject property.

4. The method as recited in claim 3, wherein the determining the number of showings is performed over a time period.

5. The method as recited in claim 1, wherein the determining the average showing duration for the at least one of the set of comparable properties is performed over a time period.

6. The method as recited in claim 1, wherein the determining showing data for the at least one of the set of comparable properties includes determining a number of showings for the at least one of the set of comparable properties.

7. The method as recited in claim 6, wherein the determining the number of showings is performed over a time period.

8. The method as recited in claim 1, wherein the comparing is performed by a showing application on a handheld device.

9. The method as recited in claim 1, wherein the comparing is performed by a subsystem that electronically receives the subject property.

10. The method as recited in claim 1, wherein the at least one comparable property relates to at least one of comparable geographical area, comparable price, comparable number of bedrooms, and comparable number of bathrooms.

11. The method as recited in claim 1, wherein the step of electronically receiving the subject property comprises receiving the subject property at a listing recommendation server hosting an analytics software application configured to determine a set of comparable properties from property data stored in a buyer storage system based on the subject property stored in the buyer storage system, and configured to determine the showing data for the subject property and the at least one of the set of comparable properties.

12. A system for evaluating real estate showing data for a subject property, comprising:
   an electronic key box;
   an electronic key server in communication with the electronic key box, the electronic key server including a database that stores showing data associated with the electronic key box;
   a buyer server in communication with the electronic key server;
   a buyer storage system in communication with the buyer server and the electronic key server, the buyer storage system including a database that stores property data; and
   a listing recommendation server hosting an analytics software application configured to determine a set of comparable properties from the property data stored in the buyer storage system based on a subject property stored in the buyer storage system, and configured to determine showing data for the subject property and at least one of the set of comparable properties, wherein the showing data comprises an average showing duration for the subject property and an average showing duration for the at least one of the set of comparable properties.

13. The system as recited in claim 12, further comprising a handheld device running an agent application, the handheld device in electronic communication with the electronic key server and the electronic key box.

14. The system as recited in claim 12, further comprising a handheld device running an agent application, the electronic key box in communication with the electronic key server via the handheld device.

15. The system as recited in claim 12, further comprising a handheld device running an agent application, the handheld device operable to determine a proximity to the electronic key box to determine the showing data.

16. The system as recited in claim 15, wherein the showing data includes an entry time and an exit time associated with the subject property.

17. The system as recited in claim 12, wherein the analytics software application compares the showing data for the subject property and the showing data for at least one of the set of comparable properties.

18. The system as recited in claim 12, further comprising a handheld device running a showing application, the handheld device operable to compare the showing data for the subject property and the showing data for the at least one of the set of comparable properties and to present a graphical comparison of the showing data for the subject property and the showing data for the at least one of the set of comparable properties.

19. The system as recited in claim 12, wherein the showing data further comprises a number of showings for the subject property and a number of showings for the at least one of the set of comparable properties.

* * * * *